(12) United States Patent
Puskas (10) Patent No.: US 8,026,325 B2
(45) Date of Patent: Sep. 27, 2011

(54) CO-POLYMERIZATION OF AN ISOOLEFIN WITH A HALOGENATED CO-MONOMER

(75) Inventor: Judit E Puskas, Akron, OH (US)

(73) Assignee: Lanxess Inc., Sarnia, ON (CA)

( * ) Notice: Subject to any disclaimer, the term of this patent is extended or adjusted under 35 U.S.C. 154(b) by 796 days.

(21) Appl. No.: 11/888,252

(22) Filed: Jul. 31, 2007

(65) Prior Publication Data

US 2008/0051544 A1 Feb. 28, 2008

Related U.S. Application Data

(60) Provisional application No. 60/839,454, filed on Aug. 23, 2006.

(51) Int. Cl.
*C08F 114/16* (2006.01)

(52) U.S. Cl. ......................................... 526/291

(58) Field of Classification Search ............... 526/291
See application file for complete search history.

(56) References Cited

U.S. PATENT DOCUMENTS

| | | | | |
|---|---|---|---|---|
| 2,263,654 A * | 11/1941 | Sparks et al. | ............... | 526/291 |
| 3,299,020 A | 1/1967 | Hunter et al. | ............... | 260/87.5 |
| 4,121,032 A * | 10/1978 | Nakaguchi et al. | ............ | 526/197 |
| 4,201,702 A * | 5/1980 | Blount | ............... | 524/66 |
| 4,384,126 A | 5/1983 | Kane | ............... | 549/346 |
| 6,710,147 B2 * | 3/2004 | Cottman | ............... | 526/237 |
| 6,825,302 B1 * | 11/2004 | Cottman et al. | ............... | 526/237 |
| 2003/0114620 A1 * | 6/2003 | Cottman | ............... | 526/291 |

FOREIGN PATENT DOCUMENTS

| | | |
|---|---|---|
| EP | 609 737 | 8/1994 |
| EP | 0 609 737 | 6/2000 |
| GB | 1060365 | 3/1967 |

OTHER PUBLICATIONS

Z.A. Sadykhov, F.M. Aliev, Azerb. Khim. Zh. 1970, 3, 96.

* cited by examiner

*Primary Examiner* — Bernard Lipman
(74) *Attorney, Agent, or Firm* — Michael A. Miller (57) ABSTRACT

A co-polymer of isobutene and 4-bromo-3-methyl-1-butene formed by direct co-polymerization in a single-step process. A continuous process for forming the co-polymer preferably comprises periodic or semi-continuous addition of catalyst to a mixed monomer solution. Semi-continuous reverse addition of the mixed monomer solution to a pre-provided catalyst solution may also be employed. The co-polymer exhibits allylic bromide functionality and is advantageously curable by either ZnO curing systems or sulfur-based curing systems.

20 Claims, 10 Drawing Sheets

CO-POLYMERIZATION OF AN ISOOLEFIN WITH A HALOGENATED CO-MONOMER

This Application claims the benefit of U.S. Provisional Application Ser. No. 60/839,454 filed on Aug. 23, 2006.

FIELD OF THE INVENTION

The invention relates to the direct co-polymerization of an isoolefin with a halogenated co-monomer. More particularly, the invention relates to the formation of brominated co-polymers by direct co-polymerization of isoolefin monomers with 4-bromo-3-methyl-1-butene monomers.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

The first major application of IIR was in tire inner tubes. Despite the low levels of backbone unsaturation (ca. 0.8-1.8 mol %), IIR possesses sufficient vulcanization activity for inner tube application. With the evolution of the tire inner liner, it became necessary to enhance the cure reactivity of IIR to levels typically found for conventional diene-based elastomers such as butadiene rubber (BR) or styrene-butadiene rubber (SBR). To this end, halogenated grades of butyl rubber were developed.

Halobutyl rubbers are prepared through post halogenation of butyl rubber dissolved in an organic solution. For example, the treatment of solutions of IIR dissolved in hexane with elemental chlorine or bromine results in the formation of chlorobutyl (CIIR) and bromobutyl (BIIR) rubber. These halobutyl rubbers are marked by the presence of reactive allylic halides along the polymer main chain. The enhanced reactivity of these moieties (c.f. traditional elastomer unsaturation) elevates the cure reactivity of CIIR and BIIR to levels comparable to those possessed by materials such as BR and SBR. This allows for acceptable levels of adhesion between, for example, a BIIR based inner liner formulation and a BR based carcass compound. Not surprisingly, the enhanced polarizability of Br compared to Cl results in BIIR being far more reactive than CIIR. As such, BIIR is the most commercially significant grade of halobutyl rubber.

This conventional process of producing halobutyl rubber has a number of problems. The butyl rubber must first be produced, typically at temperatures from −70 to −100° C., then separated from the polymerization diluent (typically methyl chloride), dried, and then re-dissolved in a hexane solution for treatment with elemental chlorine or bromine at temperatures from 40 to 65° C. There are significant energy and solvent costs associated with this multi-step process. Furthermore, the halogenation process involves an aqueous quenching step that generates a significant volume of acid requiring neutralization before disposal. The conventional process is costly and involves multiple steps; in order to simplify the process, it would be desirable to produce a halogenated butyl rubber directly during polymerization in a single-step process by co-polymerizing an isoolefin with a halogenated co-monomer.

There have been previous attempts to co-polymerize isoolefins with halogenated co-monomers. In particular, co-polymerization with brominated co-monomers was attempted using p-Bromostyrene (Z. A. Sadykhov, F. M. Aliev, *Azerb. Khim. Zh.* 1970, 3, 96) and 2-Bromo-2-methyl-1,3-butadiene (EP 0 609 737). These attempts have all met with limited commercial success. However, there have been no reports in the literature on the copolymerization of Isobutylene (IB) with 4-Bromo-3-methyl-1-butene (BMB) and this particular co-monomer therefore remains unexplored.

The need therefore still exists for co-polymers of isoolefins with halogenated co-monomers, particularly brominated co-monomers, and simplified processes for producing those co-polymers.

SUMMARY OF THE INVENTION

The invention comprises an isoolefin co-polymerized with a halogenated co-monomer. Preferably, the invention comprises halogenated monomers which, when copolymerized with the isoolefin monomer, yield a non-vinylic, non-allylic primary bromine with an adjacent tertiary carbon. When the halogen is removed, the primary carbocation preferably rearranges into a tertiary carbocation that subsequently enters into nucleophilic substitution or can undergo elimination, thereby forming double bonds. In this manner, a co-polymer of the isoolefin with the halogenated co-monomer can be produced with high conversion and selectivity to yield a useful halogenated co-polymer in a single step process.

According to the present invention, there is provided a polymer comprising: repeating units derived from at least one isoolefin monomer; and, repeating units derived from a halogenated co-monomer of the formula:

wherein,
$R_1$ is a $C_1$-$C_{20}$ alkyl group, a $C_2$-$C_{20}$ linear or branched olefinic group, or a substituted aromatic hydrocarbon,
$R_2$ is hydrogen or a $C_1$-$C_{20}$ alkyl group,
X is bromine or chlorine.
The halogenated co-monomer may comprise, for example, 4-bromo-3-methyl-1-butene.

According to another aspect of the present invention, there is provided a cured article made from a polymer as described above.

According to yet another aspect of the present invention, there is provided a method of preparing a polymer comprising: providing a mixture of an isoolefin monomer and a halogenated co-monomer of the formula:

wherein,
$R_1$ is a $C_1$-$C_{20}$ alkyl group, a $C_2$-$C_{20}$ linear or branched olefinic group, or a substituted aromatic hydrocarbon,
$R_2$ is hydrogen or a $C_1$-$C_{20}$ alkyl group,
X is bromine or chlorine,
dissolved in a polymerization diluent; adding a cationogen initiator in a semi-continuous manner to the mixture; and, reacting the monomers to form the polymer.

According to still another aspect of the present invention, there is provided a method of preparing a polymer comprising: providing a solution of a cationogen initiator in a catalyst solvent; adding a mixture of an isoolefin monomer and a halogenated co-monomer of the formula:

wherein,
R$_1$ is a C$_1$-C$_{20}$ alkyl group, a C$_2$-C$_{20}$ linear or branched olefinic group, or a substituted aromatic hydrocarbon,
R$_2$ is hydrogen or a C$_1$-C$_{20}$ alkyl group,
X is bromine or chlorine,
dissolved in a polymerization diluent in a semi-continuous manner to the solution; and, reacting the monomers to form the polymer.

Further features of the invention will be described in the following detailed description.

BRIEF DESCRIPTION OF THE DRAWINGS

Having summarized the invention, preferred embodiments thereof will now be described with reference to the accompanying figures, in which.

DETAILED DESCRIPTION OF PREFERRED EMBODIMENTS

The co-polymer is not limited to a specific isoolefin. However, isoolefins within the range of from 4 to 16 carbon atoms, in particular 4-7 carbon atoms, such as isobutene, 2-methyl-1-butene, 3-methyl-1-butene, 2-methyl-2-butene, 4-methyl-1-pentene and mixtures thereof are preferred. Most preferred is isobutene.

The halogenated co-monomer may comprise any suitable monomers which, when copolymerized with the isoolefin monomer, yield a non-vinylic, non-allylic primary bromine with an adjacent tertiary carbon. Preferably, the co-monomer comprises a linear C$_4$ backbone having an olefinic group at one end and a halogen group at an opposite end therefrom. More preferably, the co-monomer comprises an alkyl group located on the third carbon of the C$_4$ backbone. Yet more preferably, the halogenated co-monomer is of the formula:

wherein,
R$_1$ is a C$_1$-C$_{20}$ alkyl group, a C$_2$-C$_{20}$ linear or branched olefinic group, or a substituted aromatic hydrocarbon,
R$_2$ is hydrogen or a C$_1$-C$_{20}$ alkyl group,
X is bromine or chlorine.

Still more preferably R1 is a C1-C4 alkyl group and R2 is hydrogen or a C1-C4 alkyl group. Even more preferably, R1 is methyl or ethyl and R2 is hydrogen. Most preferably, the halogenated co-monomer is 4-bromo-3-methyl-1-butene.

The molar ratio of the isoolefin monomer to the halogenated co-monomer may be from 10 to 100. The halogenated co-monomer may be provided in a weight percent ratio with the isoolefin of from 0.02 to 0.3, preferably from 0.03 to 0.30, more preferably from 0.05 to 0.20, yet more preferably from 0.10 to 0.20.

The co-polymer may comprise at least 0.15 mol % of halogenated units derived from the halogenated co-monomer, for example brominated units. Preferably, the co-polymer comprises at least 0.4 mol %, more preferably at least 1.0 mol %, yet more preferably at least 1.5 mol %, still more preferably at least 2.0 mol %, even more preferably at least 2.5 mol %, yet still more preferably at least 3.0 mol %, yet even more preferably at least 4.0 mol %, most preferably from 2 to 5 mol % of halogenated units derived from the halogenated co-monomer.

The molecular weight M$_n$ of the co-polymer is preferably from 90 to 500 kg/mol, preferably from 150 to 500 kg/mol, more preferably from 200-400 kg/mol.

The co-polymer is made by dissolving the co-monomers in a suitable polymerization diluent. The polymerization diluent may comprise methyl chloride, chloroform or hexane, or any other solvent or mixture of solvents known to those skilled in the art. Preferably, the polymerization diluent comprises methyl chloride.

A cationogen initiator according to the present invention may comprise a Friedel-Crafts catalyst capable of initiating cationic polymerization in combination with an activator, as is known in the art. The cationogen initiator is preferably soluble in the polymerization diluent and may be provided by itself or dissolved in a catalyst solvent. In this case, the catalyst solvent and polymerization diluent are preferably miscible in one another. The catalyst solvent may comprise methyl chloride, chloroform or hexane. In a preferred embodiment, the catalyst solvent is the same as the polymerization diluent. A preferred example of a suitable cationogen initiator dissolved in a catalyst solvent is a solution of aluminum chloride (AlCl$_3$) in methyl chloride. The cationogen initiator may be activated by a suitable proton source, such as water or hydrochloric acid (HCl).

In a continuous process, the catalyst solution may be added to the co-monomers in a semi-continuous fashion at periodic intervals. Examples of semi-continuous catalyst addition methods include drop wise addition. It will be understood by those skilled in the art that the term "drop wise" need not necessarily refer to the relative volumes employed and that upon scale-up a "drop" of catalyst solution may be insufficient to cause reaction. The term is therefore meant to imply a semi-continuous addition, preferably of a constant volume of catalyst, at periodic intervals.

The continuous process may employ "reverse addition", wherein the solution of co-monomer reactants is added to a catalyst solution provided within the reactor volume at the desired reaction conditons. The reactants may be added to the catalyst solution in a semi-continuous or drop wise fashion.

Preferably, the yield of co-polymer is at least 12%, more preferably at least 20%, yet more preferably at least 40%, even more preferably at least 50%, still more preferably at least 60%, yet even more preferably at least 70%, still yet more preferably at least 80%

In order to increase the halogen content of the co-polymer, subsequent conventional halogenation operations may be performed. The halogens used in these post-halogenation operations may include bromine or chlorine. In this manner, a desired halogen content may be obtained in the co-polymer.

Figure 7:
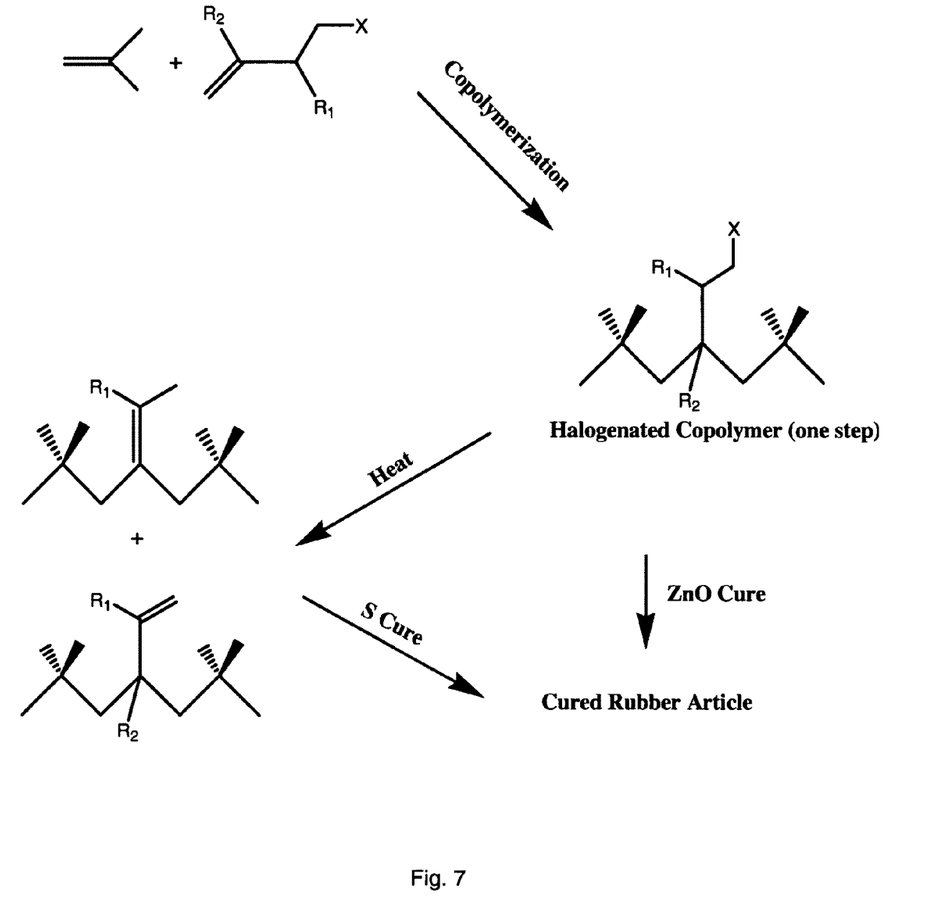
FIG. 7 shows possible elimination reactions of the brominated copolymer and subsequent vulcanization possible with a sulfur cure or with a ZnO cure.

By 1,2 insertion of BMB in a copolymerization with Isobutylene (IB), a nonvinylic, nonallylic primary bromine with a tertiary carbon as neighbor is provided (see FIG. 7). Upon removing the bromine group, a primary carbocation is formed which is known to rearrange into a tertiary carbocation. This carbocation can either participate in a nucleophilic substitution reaction or can undergo elimination, forming double bonds as shown in FIG. 7.

Under suitable conditions, these reactions lead to crosslinking or curing of the co-polymer. Curing may occur either via the primary bromine (ZnO curing) or via the double bonds (sulfur curing). The co-polymer may comprise components of a zinc oxide (ZnO) curing system or a sulfur curing system. The cured co-polymer may be used in the formation of shaped articles for a variety of applications, particularly in applications where halogenated butyl rubber is normally employed, such as in tire inner liner formulations.

The invention is further illustrated with reference to the following examples.

EXAMPLES

Experimental
Materials

Synthesis of 4-Bromo-3-methyl-1-butene

Under nitrogen atmosphere 285 mg (1,50 mmol) CuI were added to 285 ml diethyl ether and stirred for 30 min at room temperature. To this solution 32 g (149.6 mmol) 1,4-Dibromo-2-butene were added. After an additional stirring of 30 min at room temperature the reaction mixture was cooled to −10° C. and 100 ml (300 mmol) of MeMgI (3.0 M, in diethylether) were added through a dropping funnel within 2 hrs. Then the reaction mixture was allowed to warm up to room temperature and was stirred for another 20 hrs. At the end of this period ice was used to react with excess MeMgI and the product was extracted several times with diethyl ether. The combined organic extracts were dried over $MgSO_4$ before being distilled: 10.2 g (45%) 4-Bromo-3-methyl-1-butene, boiling point: 110-114° C. (b.p.: 110-112° C.[5]). The NMR data match with the data given in literature (R. W. Hoffmann et al., *Liebigs Ann. Chem.* 1992, 11, 1137). All chemicals used were purchased from Aldrich.

Other Materials

Isoprene (IP; Aldrich) was freshly distilled before use. Isobutylene (IB) and Methylchloride (MeCl) from Matheson were dried by passing through a column filled with BaO and $CaCl_2$ and condensed at the reaction temperature. $AlCl_3$ from Aldrich was used as received.

Procedures
Polymerization

All polymerizations were carried out in a MBraun Lab Master 130 glove box equipped with an integral cold bath under dry nitrogen at −80° C. The cold bath (hexane) was chilled with an FTS Flexi Cool immersion cooler. 500 ml round bottom flasks equipped with overhead stirrers were charged with MeCl, IB, IP or BMB. The polymerization started with the addition of the $AlCl_3$ catalyst solution, which was prepared in advance (0.45 g $AlCl_3$ in 50 g MeCl premixed at −30° C. for 30 min and then cooled down to the reaction temperature). After 5-10 min the polymerizations were terminated by the addition of 30 ml prechilled methanol. The obtained polymers were purified by being redissolved in hexane, precipitated from methanol and dried in a vacuum oven at +40° C. The final conversions were determined gravimetrically. A control butyl polymerization was carried out before the copolymerizations with the brominated monomer. The original recipe used for butyl polymerization was changed by reducing the IB amount from 60 g per 200 g total to 20 g to avoid formation multimodal distributions in the resulting polymer. The recipe used was as follows: IB=20 g, IP=0.53 g, MeCl=179.5 g, $AlCl_3$-catalyst solution=2 ml.

Polymer and Comonomer Analysis

Polymer molecular weights and molecular weight distributions were determined by SEC with a Waters system equipped with six Styragel HR columns (pore sizes=100, 500, $10^3$, $10^4$, $10^5$ and $10^6$ Å) and thermostated at 35° C., a DAWN DSP 18-angle laser light scattering detector (Wyatt Technology), a Waters 410 DRI detector thermostated to 40° C., and a Waters 996 photodiode array PDA detector set at 254 nm. THF, freshly distilled off $CaH_2$, was employed as the mobile phase and was delivered at 1 mL/min. The ASTRA software package (Wyatt Technology) was used to obtain absolute molecular weight data with dn/dc=0.093. The same value was used for the copolymers, since less than 2 mol % of the second monomer (IP or BMB) is incorporated. $^1$H-NMR spectra were taken on a Varian 300 MHz (BMB) and a Bruker 500 MHz NMR (polymers) using $CDCl_3$ as solvent.

Results and Discussion

Copolymerizations of Isobutylene (IB) and 4-Bromo-3-methyl-1-butene (BMB) were done with different concentrations of BMB and a three times higher concentration of $AlCl_3$-catalyst solution (6 ml) compared to the control butyl experiment (see Table 1). Unlike the control butyl polymer (1), strings could be observed upon introduction of the catalyst solution to the reaction mixture.

TABLE 1

Copolymerizations[a] of IB with BMB.

| Copolymer | BMB [mol/l] | B.#[b] | $M_w$ [kg/mol] | $M_n$ [kg/mol] | Conversion [%] |
|---|---|---|---|---|---|
| 1[c] | / | 2.6 | 430 | 195 | 72.0 |
| 2 | 0.036 | 5.8 | 600 | 150 | 12.6 |
| 3 | 0.018 | 2.9 | 880 | 500 | 20.5 |
| 4 | 0.072 | 11.6 | 600 | 330 | 12.2 |

[a][IB] = 1.8 mol/l; $AlCl_3$ catalyst solution: 6 ml; solvent: MeCl; total reaction weight: 200 g; T = −80° C.
[b]B.# is defined as for IP: [(BMB) wt %/(IB wt %)] × 100.
[c]Control butyl polymerization: [IP] = 0.036 mol/l, $AlCl_3$ catalyst solution: 2 ml.

Figure 1:
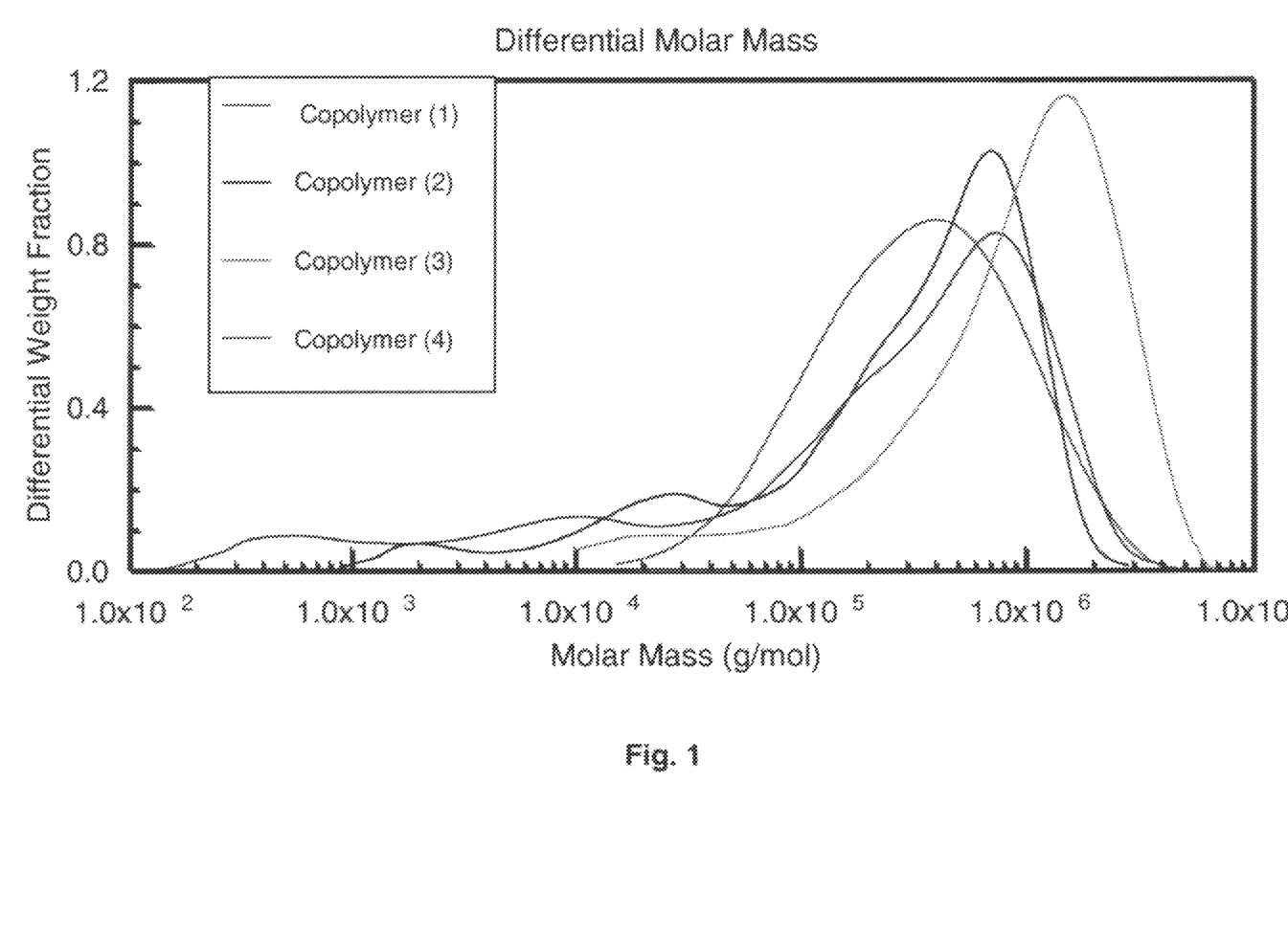
FIG. 1 shows SEC traces of copolymers (1)-(4)

The molecular weight of the control butyl polymer (1) was in the expected range ($M_w$=430 kg/mol, $M_n$=195 kg/mol). If the same amount of BMB (based on molar basis) instead of IP was used, the copolymer (2) had a significantly higher $M_w$ (600 kg/mol) but $M_n$ (150 kg/mol) was lower compared to polymer (1). The highest molecular weight (copolymer (3): $M_w$=880 kg/mol, $M_n$=500 kg/mol) was obtained by using half the amount of BMB. The copolymerization with the double amount of BMB gave copolymer (4) with the same $M_w$=600 kg/mol as copolymer (2), but $M_n$=330 kg/mol was twice as big as that of copolymer (2). All IB-BMB copolymers contained some low molecular weight fractions (see FIG. 1). The conversions ranged between 12.2-20.0%, although three times more catalyst was used compared to the control butyl polymerization (1) (see Table 1). Interestingly, an increase of the amount of BMB did not have a big impact on the conversion (see copolymerization (2) and (4)). Usually, an increasing IP amount causes a dramatic drop in the copolymer conversion. This indicates that physical effects such as mixing and mass transfer play a role under polymerization conditions.

Figure 2:
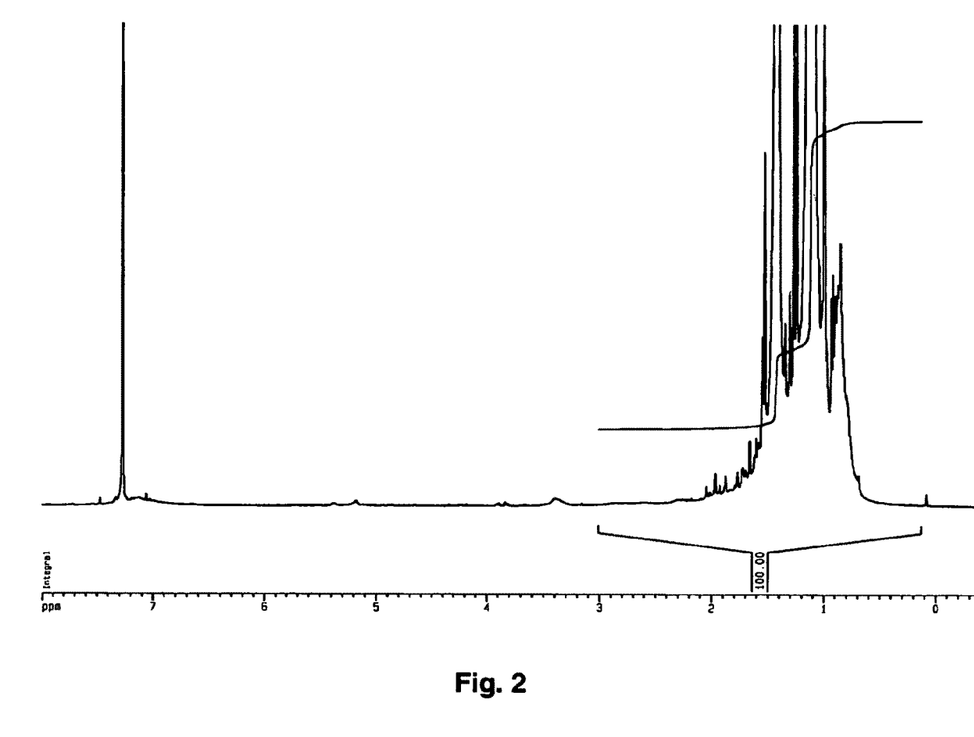
FIG. 2 shows the 500 MHz $^1$H-NMR spectrum of copolymer (4)
Figure 8:
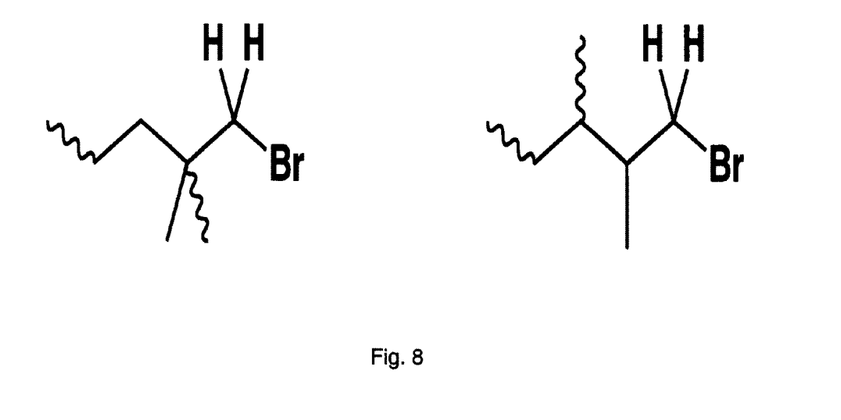
FIG. 8 shows different incorporation routes of the brominated monomer.

The incorporation of the brominated monomer was proven by NMR spectroscopy. FIG. 2 shows the $^1$H-NMR spectrum of copolymer (4). The characteristic signals for the free monomer (multiplet at 5.75 ppm) could not be found in the spectrum, demonstrating that a true copolymer was formed. The broad signal around 3.3 ppm can be assigned to the protons of bromomethylene units (~CH$_2$Br) derived from 1,2- or 1,3-incorporation of the brominated monomer shown in FIG. 8

Figure 9:
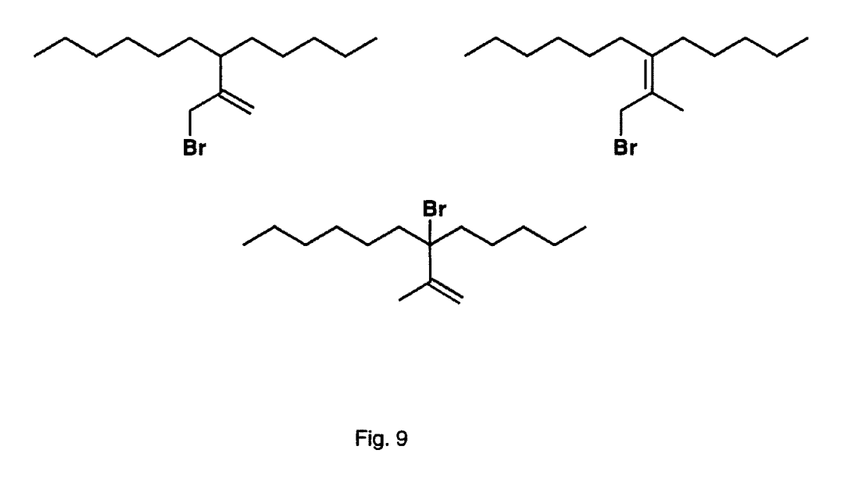
FIG. 9 shows allylic structures derived from the 1,2-incorporation of BMB; and,
FIG. 10 shows structures for the olefinic signals.

Theoretically, allylic structures similar to those found in bromobutyl (shown in FIG. 9) can be derived from the 1,2-incorporation.

Figure 3:
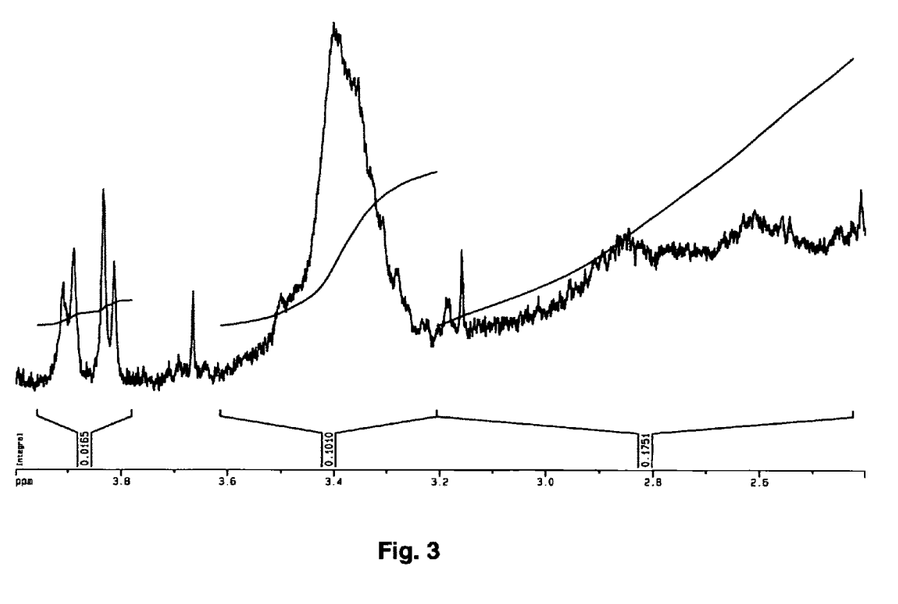
FIG. 3 shows an enlargement of the aliphatic area of the 500 MHz $^1$H-NMR spectrum of copolymer (4) provided in FIG. 2.
Figure 4:
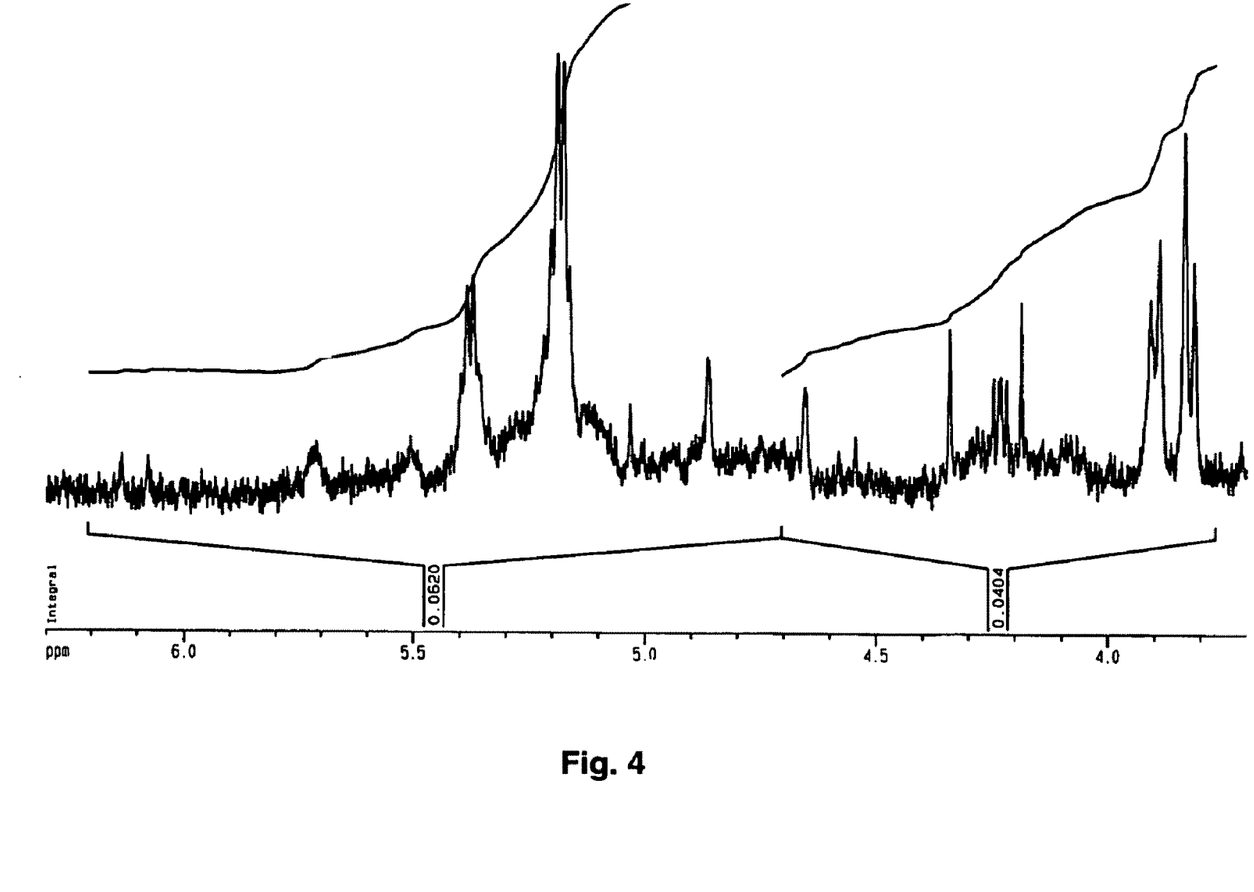
FIG. 4 shows an enlargement of the olefinic area of the 500 MHz $^1$H-NMR spectrum of copolymer (4) provided in FIG. 2.
Figure 10:
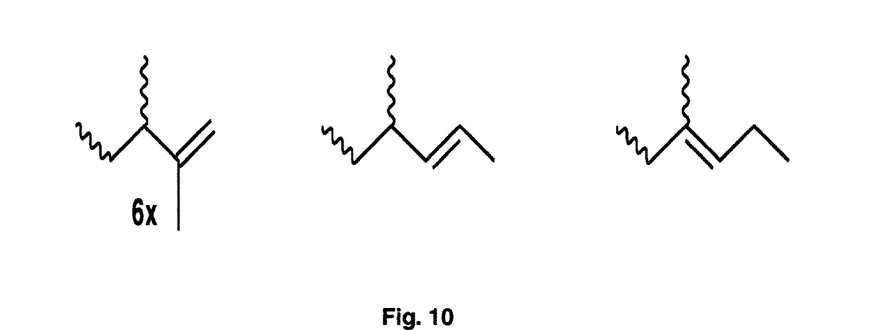

The simulated spectra (using ACDLabs proton NMR simulation software) of these allylic structures supported the conclusion that the absorptions at 5.39 ppm and 3.8-3.9 ppm (see FIG. 2-4) are derived from allylic structures. The simulated spectra also supported the hypothesis that the signals at 4.65 ppm, 4.85 ppm and 5.15-5.2 ppm (see FIGS. 2 and 4) can be assigned to olefinic protons derived from the structures in FIG. 10

For the calculation of the incorporated mol % of bromomethylene units in the copolymers the following equations were used:

(i) 7x+8y=Integration area of aliphatic protons (100 in FIG. 2)
  (ii) 2x=Integration area of olefinic protons with Br-ligand
  ⇒ x=(Integration area of olefinic protons with Br-ligand)/2
  ⇒ Substitute x in (i) and solve equation for y.
  Mol % (incorporated comonomer)=[x/(x+y)]·100%

According to the above calculation, copolymer (4) had an incorporation of 0.41 mol % of brominated units. This copolymer also had a content of 0.13 mol % of the olefinic structures shown in FIG. 10 (calculation: 6x+8y=100). Table 2 shows the calculated mol % of BMB, which are incorporated in the copolymers (2)-(4). The incorporation of BMB ranged from 0.15-0.41 mol %.

TABLE 2

Total BMB content (mol %) in the copolymers (2)-(4).

| Copolymer | Bromomethylene area [mol %] | Olefinic area [mol %] | Total BMB content [mol %] | Reactivity ratio $r_{IB}$ |
|---|---|---|---|---|
| 2 | 0.31 | 0.16 | 0.47 | 4.6 |
| 3 | 0.15 | 0.07 | 0.22 | 5.2 |
| 4 | 0.41 | 0.13 | 0.54 | 8.7 |

We also calculated the reactivity ratio for the IB-BMB system was calculated according to the following equation:

$r_{IB}$=ln(1-$C_{IB}$)/ln(1-$C_{ScBr}$) with C=conversion in fraction

The $r_{IB}$ values show that the BMB is less reactive towards the IB than IP.

All copolymers described so far contained some low molecular weight fractions (see FIG. 1) and the conversions were low (12.2-20.0%). In addition, the mol % of BMB incorporated in the copolymers was not very high (see Table 2).

To improve both the yield and the incorporation of BMB, the method of addition of the AlCl$_3$-catalyst solution to the reaction mixture was varied. Three different methods of catalyst addition were used: adding the catalyst semi-continuously (drop wise) over a period of 5.5 min; spraying it into the reaction vessel continuously using a bent tip needle; and, injecting the catalyst into the reaction vessel in a single shot. The concentration of BMB was also varied. For these copolymerizations, 40 g IB (total reaction weight of 400 g) was used in order to obtain enough material for curing experiments. As can be seen from the conversion data of copolymerization (5)-(7), the method of catalyst addition had a strong effect on the final yield.

TABLE 3

Copolymerizations[a] of IB and BMB using different ways of catalyst addition.

| Copolymer | BMB [mol/l] | B.#[b] | $M_w$ [kg/mol] | $M_n$ [kg/mol] | Conversion [%] |
|---|---|---|---|---|---|
| 5(d) | 0.018 | 2.9 | 1 355 | 400 | 57 |
| 6(d) | 0.036 | 5.8 | 1 320 | 350 | 51 |
| 7(d) | 0.072 | 11.6 | 1 150 | 210 | 54 |
| 8(s) | 0.036 | 5.8 | 900 | 90 | 24 |
| 9(s) | 0.072 | 11.6 | 590 | 260 | 21 |
| 10(i) | 0.036 | 5.8 | 1 190 | 200 | 20 |

[a] [IB] = 1.8 mol/l; AlCl$_3$ catalyst solution: 12 ml; solvent: MeCl; total reaction weight: 400 g; T = −80° C.
[b] B.# is defined as follows: [(BMB) wt %/(IB wt %)] × 100.
(s) catalyst was sprayed in;
(d) catalyst was added dropwise;
(i) catalyst was injected directly into the reaction mixture.

The highest yield (51%, copolymer (6)) was obtained when the catalyst solution was added drop wise. This polymerization started out with a fine dispersion at the beginning and finished up as a big rubber ball at the end of catalyst introduction. Using the continuous spraying method gave a yield of 24% (copolymer (8)). The formation of polymer strings could be observed upon introduction of the catalyst solution. Almost the same conversion was obtained (20%, copolymer (10)), when the catalyst solution was injected in a single shot. By varying the BMB concentration (copolymer (5)-(7) and (9)) no significant effect on the conversion data could be observed.

Using different methods of catalyst addition with the same BMB concentration (copolymer (6), (8), and (10)) did effect the molecular weights $M_w$ and $M_n$. With the "sprayed in" method (copolymer (8)) the lowest $M_w$ (900 kg/mol) and $M_n$ (90 kg/mol) were obtained, whereas the "drop wise addition" method gave a copolymer (6) with the highest $M_w$ (1320 kg/mol) and $M_n$ (350 kg/mol). Referring to the molecular weight data in Table 3, it can be seen that increasing BMB concentration results in decreasing $M_n$. The BMB concentration had no significant effect on $M_w$.

The NMR spectra of copolymers (5)-(10) all showed signals for olefinic protons at 4.65 ppm, 4.85 ppm, 5.2 ppm and 5.4 ppm. The signals can be assigned to structures shown in FIG. 10. The signals demonstrating incorporation of brominated structures (~3.3 ppm for bromomethylene units, between 3.8 ppm and 4.5 ppm for the allylic structures shown in FIG. 9) were either weak or totally absent. When worked up differently (redissolving in Hexane and no precipitation in MeOH), copolymers exhibited these characteristic signals, indicating that brominated structures most probably are present in the low molecular weight fractions of the copolymer.

Since the polymerization methods used thus far could not raise the BMB content in the copolymer, the addition order of the reactants was varied in an effort to improve the incorporation. The $AlCl_3$ catalyst solution was first provided in the reaction vessel prior to drop wise addition of the monomer mixture (IB/BMB (IP)) (reverse addition). Here also, polymer strings could be observed upon introduction of the IB/BMB mixture to the $AlCl_3$ catalyst solution. Using this new procedure, the concentration of BMB and $AlCl_3$ catalyst solution was varied (see Table 4). For some of the copolymerizations, the IB amount was scaled up to 40 g in order to get enough material for curing experiments.

TABLE 4

Copolymerization of IB with BMB using a reverse addition of catalyst solution and monomer.

| Copolymer | BMB [mol/l] | B.#[a] | $AlCl_3$-solution [ml] | $M_w$ [kg/mol] | $M_n$ [kg/mol] | Conversion [%] |
|---|---|---|---|---|---|---|
| 11[b,c] | / | 2.6 | 2 | 600 | 355 | 68.0 |
| 12[b] | / | 2.6 | 2 | 400 | 233 | 41.0 |
| 13[d] | 0.036 | 2.9 | 6 | 610 | 265 | 58.0 |
| 14[e] | 0.036 | 5.8 | 12 | 810 | 285 | 82.0 |
| 15[e] | 0.108 | 17.4 | 18 | 570 | 170 | 17.0 |
| 16[e] | 0.180 | 29.0 | 12 | 635 | 115 | 51.0 |

[a]B.# is defined as for IP: [(BMB) wt %/(IB wt %)] × 100.
[b]Control butyl polymerization: [IB] = 1.8 mol/l; [IP] = 0.036 mol/l; total reaction weight: 200 g; T = −80 C.
[c]Normal addition way of catalyst solution and monomer mixture.
[d][IB] = 1.8 mol/l; total reaction weight: 200 g; T = −80° C.
[e][IB] = 1.8 mol/l; total reaction weight: 400 g; T = −80° C.

The results obtained for the control butyl polymerizations (11) and (12) showed that the addition order of catalyst solution and monomer mixtures influenced the molecular weight as well as the conversion. By using the reverse addition procedure (copolymer (12)) $M_w$, $M_n$ and the yield dropped compared to copolymer (11). Running the reverse addition polymerization procedure with BMB, a copolymer (13) with $M_w$=610 kg/mol and $M_n$=265 kg/mol was obtained. In comparison to the control butyl polymerization (12) the molecular weight of copolymer (13) is much higher, indicating again that BMB is a weaker chain transfer agent than IP. The yield for copolymer (13) was 58%. The conversion for the comparable control butyl polymer (12) was 41%. These conversion data are contrary to the data obtained for the normal polymerization procedure (see copolymer (1) and (2) in Table 1).

Using a scaled-up recipe of copolymerization (13), the molecular weight and yield of the resulting copolymer (14) were higher. Compared with copolymerization (15), increasing the BMB amount by 5 times caused a significant decrease in the molecular weight and yield (see copolymerization (16)). The increase of the BMB amount also caused a dramatic drop in the copolymer conversion. This is in contrast to the results obtained using the normal polymerization procedure (see copolymerizations (2) and (4) in Table 1). In comparison to the normal polymerization procedure (see FIG. 1) the SEC traces of the copolymers (13)-(16) showed no low molecular weight fractions.

Figure 5:
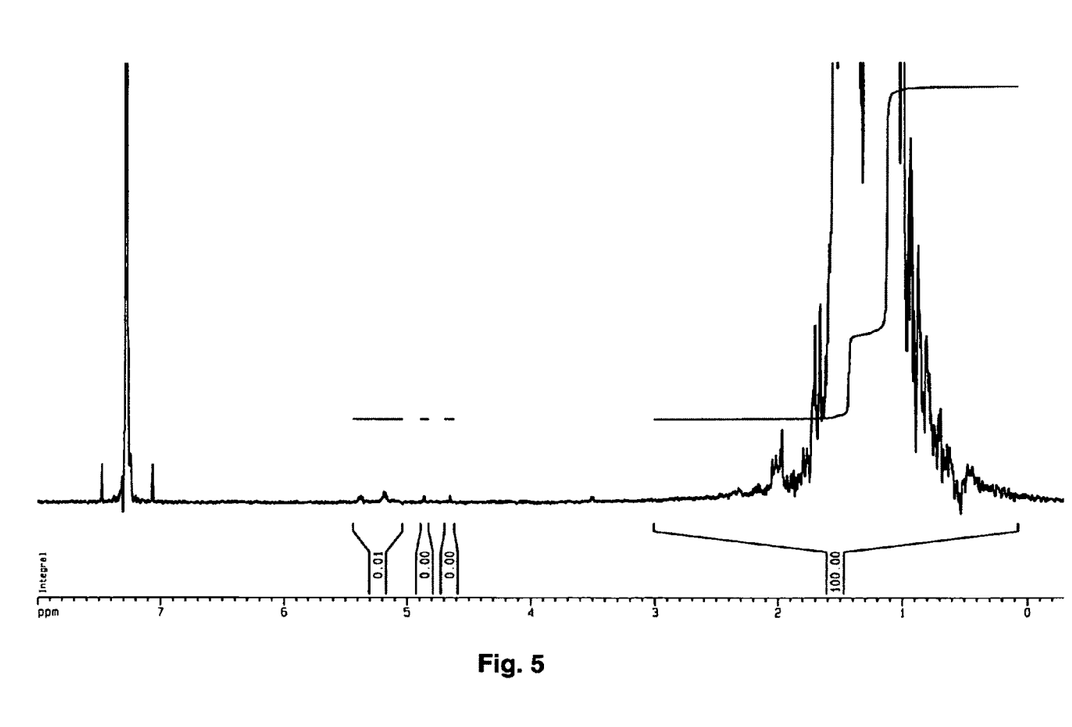
FIG. 5 shows the 500 MHz $^1$H-NMR spectrum of copolymer (14)
Figure 6:
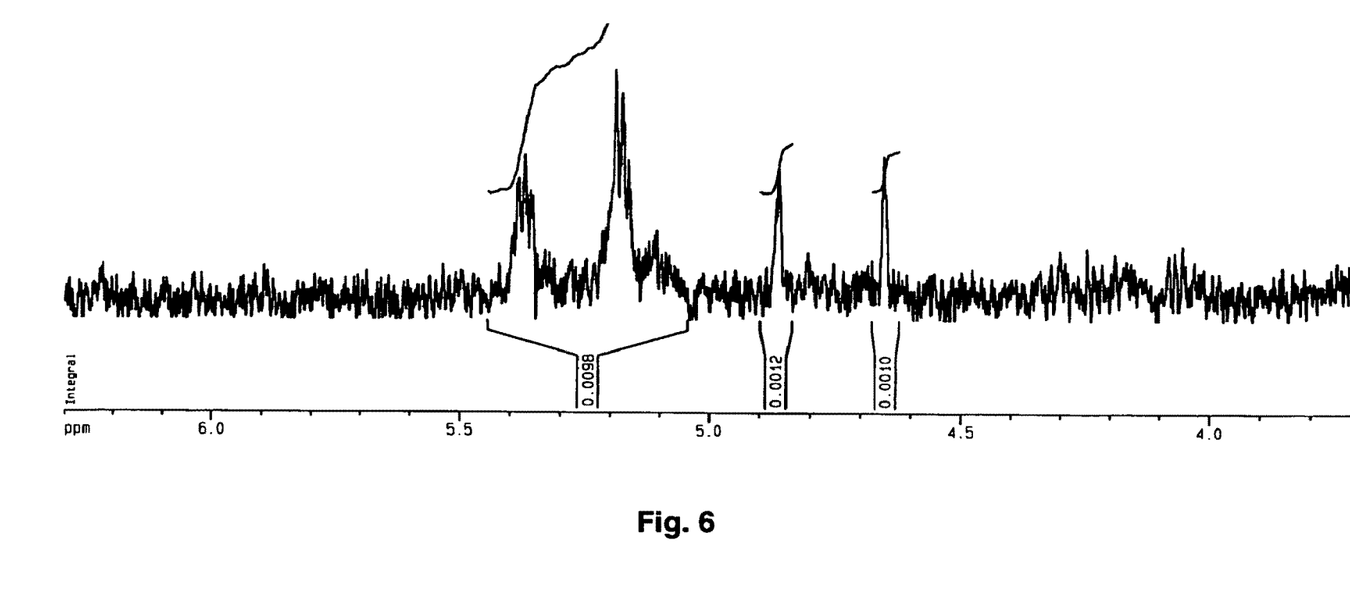
FIG. 6 shows an enlargement of the olefinic area of the 500 MHz $^1$H-NMR spectrum of copolymer (14) provided in FIG. 5.

In addition to yield and molecular weight distribution, the new polymerization procedure also influenced the structure of the copolymers obtained. Referring to FIG. 5, the $^1$H-NMR spectrum of copolymer (14) showed that a true copolymer was formed because the characteristic signal for the free BMB (multiplet at 5.75 ppm) is missing. However, according to the spectrum there are no bromine functionalities in the copolymer (no signals for the protons of bromomethylene units (~$CH_2Br$) around 3.3 ppm). The signals at 5.4 ppm, 5.2 ppm, 4.85 ppm and 4.65 ppm, shown in FIG. 6, can be assigned to olefinic protons derived from structures shown in Scheme 4. The content of these olefinic structures incorporated in the copolymers (13)-(16) range from 0.05-0.07 mol %.

In sum, using the reverse addition of catalyst solution and monomer mixture gave higher yields and the formation of low molecular weight fractions could be suppressed compared to the normal polymerization procedure. The copolymers obtained with the reverse addition procedure did not exhibit any bromine functionalities.

Curing

Curing experiments were performed with some of the copolymers using a ZnO and/or a sulfur recipe. Curing did occur with all the tested copolymers yielding rubber-like (although weak) sheets. Using the sulfur curing method (related to C=C double bonds) a small difference in the torque range (0.5-0.8 dNm) was observed. The ZnO cure also showed only very small curing due to the low content of bromo end groups in the tested copolymers.

The foregoing describes preferred embodiments of the invention and other features and embodiments of the invention will be evident to persons skilled in the art. The following claims are to be construed broadly with reference to the foregoing and are intended by the inventor to include other variations and sub-combinations that are not explicitly claimed.

The invention claimed is:

1. A polymer comprising:
   a) repeating units derived from at least one isoolefin monomer; and,
   b) repeating units derived from a halogenated co-monomer of the formula:

wherein,
   $R_1$ is a $C_1$-$C_{20}$ alkyl group, a $C_2$-$C_{20}$ linear or branched olefinic group, or a substituted aromatic hydrocarbon, $R_2$ is hydrogen or a $C_1$-$C_{20}$ alkyl group,
X is bromine or chlorine.

2. The polymer of claim 1, wherein $R_1$ is $C_1$ to $C_4$ alkyl and wherein $R_2$ is hydrogen.

3. The polymer of claim 1, wherein the halogenated co-monomer is 4-bromo-3-methyl-1-butene.

4. The polymer of claim 1, wherein X is bromine and wherein the polymer comprises at least 0.15 mol % of brominated units.

5. The polymer of claim 1, wherein X is bromine and wherein the polymer comprises from 2 to 5 mol % of brominated units.

6. The polymer of claim 1, having a molecular weight ($M_n$) of from 150 to 500 kg/mol.

7. A cured article made from a polymer according to claim 1.

8. The cured article of claim 7, wherein the article is made from the polymer using a zinc oxide curing system.

9. A method of preparing a polymer comprising:
 a) providing a mixture of an isoolefin monomer and a halogenated co-monomer of the formula:

wherein,
 $R_1$ is a $C_1$-$C_{20}$ alkyl group, a $C_2$ to $C_{20}$ linear or branched olefinic group, or a substituted aromatic hydrocarbon,
 $R_2$ is hydrogen or a $C_1$-$C_{20}$ alkyl group,
 X is bromine or chlorine,
 dissolved in a polymerization diluent;
 b) adding a cationogen initiator in a semi-continuous manner to the mixture; and,
 c) reacting the monomers to form the polymer.

10. The method of claim 9, wherein the catalyst solvent and/or the polymerization diluent is methyl chloride, chloroform or hexane.

11. The method of claim 9, wherein the semi-continuous addition of the cationogen initiator is in a drop-wise manner.

12. The method of claim 9, wherein the molar ratio of the isoolefin monomer to the halogenated co-monomer is from 10 to 100.

13. The method of claim 9, wherein the polymer is made by 1,2 insertion of the halogenated co-monomer in the isoolefin.

14. The method of claim 9, wherein the conversion is at least 20%.

15. A method of preparing a polymer comprising:
 a) providing a solution of a cationogen initiator in a catalyst solvent;
 b) adding a mixture of an isoolefin monomer and a halogenated co-monomer of the formula:

wherein,
 $R_1$ is a $C_1$-$C_{20}$ alkyl group, a $C_2$ to $C_{20}$ linear or branched olefinic group, or a substituted aromatic hydrocarbon,
 $R_2$ is hydrogen or a $C_1$-$C_{20}$ alkyl group,
 X is bromine or chlorine,
 dissolved in a polymerization diluent in a semi-continuous manner to the solution; and,
 c) reacting the monomers to form the polymer.

16. The method of claim 15, wherein the catalyst solvent and/or the polymerization diluent is methyl chloride, chloroform or hexane.

17. The method of claim 15, wherein the semi-continuous addition of the monomer mixture to the cationogen initiator is in a drop-wise manner.

18. The method of claim 15, wherein the molar ratio of the isoolefin monomer to the halogenated co-monomer is from 10 to 100.

19. The method of claim 15, wherein the polymer is made by 1,2 insertion of the halogenated co-monomer in the isoolefin.

20. The method of claim 15, wherein conversion is at least 50%.

* * * * *